US010658709B2

(12) United States Patent
Lee

(10) Patent No.: US 10,658,709 B2
(45) Date of Patent: May 19, 2020

(54) BATTERY PACK

(71) Applicant: SAMSUNG SDI CO., LTD., Yongin-si, Gyeonggi-do (KR)

(72) Inventor: Eunjoong Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 1404 days.

(21) Appl. No.: 14/539,017

(22) Filed: Nov. 12, 2014

(65) Prior Publication Data

US 2015/0147599 A1 May 28, 2015

(30) Foreign Application Priority Data

Nov. 22, 2013 (KR) ........................ 10-2013-0143217

(51) Int. Cl.
H01M 10/42 (2006.01)
H01M 2/10 (2006.01)
H01M 2/20 (2006.01)
H01M 2/34 (2006.01)
H01K 1/00 (2006.01)

(52) U.S. Cl.
CPC ..... *H01M 10/4257* (2013.01); *H01M 2/1022* (2013.01); *H01M 2/1061* (2013.01); *H01M 2/202* (2013.01); *H01M 2/344* (2013.01); *H01K 1/00* (2013.01); *H01M 10/425* (2013.01); *H01M 2010/4271* (2013.01); *H01M 2200/00* (2013.01); *H01M 2220/30* (2013.01)

(58) Field of Classification Search
CPC .. H01M 10/4257; H01M 2/202; H01M 2/344; H01M 2/1061; H01M 2/4257
See application file for complete search history.

(56) References Cited

U.S. PATENT DOCUMENTS

| 2003/0146734 A1* | 8/2003 | Kozu ................... H01M 2/021 320/107 |
| 2006/0051662 A1* | 3/2006 | Kwak ............... H01M 10/0431 429/142 |
| 2009/0109099 A1* | 4/2009 | Jang .................... H01Q 1/2225 343/702 |
| 2009/0191448 A1* | 7/2009 | Yamamoto ............. B29C 70/72 429/94 |
| 2011/0104520 A1* | 5/2011 | Ahn ........................ H01M 2/22 429/7 |
| 2012/0270074 A1* | 10/2012 | Koh .................... H01M 2/0212 429/7 |
| 2013/0034752 A1  | 2/2013 | Choi et al. |
| 2013/0130065 A1* | 5/2013 | Park .................... H01M 2/0275 429/7 |

(Continued)

FOREIGN PATENT DOCUMENTS

| KR | 10-2013-0016086 A | 2/2013 |
| KR | 10-2013-0070740 A | 6/2013 |
| KR | 10-2014-0025132 A | 3/2014 |

*Primary Examiner* — Jeremiah R Smith

(74) *Attorney, Agent, or Firm* — Lee IP Law, PC

(57) ABSTRACT

A battery pack includes one or more battery cells including a plurality of electrode tabs, a protective circuit module connected to the electrode tabs of the one or more battery cells, a frame accommodating the battery cells and the protective circuit module, and a protective tape covering the protective circuit module and the electrode tabs, a first surface of the protective tape including a plurality of grooves corresponding to the electrode tabs.

19 Claims, 4 Drawing Sheets

(56) References Cited

U.S. PATENT DOCUMENTS

2014/0050968 A1* 2/2014 Park .................. H01M 2/1061
   429/159
2014/0057137 A1   2/2014 Lee

* cited by examiner ical Property Office, and entitled: "BATTERY PACK," is incorporated by reference herein in its entirety.

BATTERY PACK

CROSS-REFERENCE TO RELATED APPLICATION

Korean Patent Application No. 10-2013-0143217, filed on Nov. 22, 2013, in the Korean Intellectual Property Office, and entitled: "BATTERY PACK," is incorporated by reference herein in its entirety.

BACKGROUND

1. Field

Embodiments relate to a battery pack.

2. Description of the Related Art

In general, an electronic device, e.g., a notebook computer, a mini notebook computer, a net book, a mobile computer, an ultra mobile personal computer (UMPC) or a portable multimedia player (PMP), employs a battery pack having multiple battery cells connected to each other in series and/or in parallel as a portable power source. The battery pack includes a protective circuit module (PCM) for protecting the battery cells from over-charge, over-discharge, or over-current, and the PCM is incorporated into a frame together with the battery cells welded to electrode tabs.

According to the recent tendency toward lightweight, thin, short and small devices, a battery pack needs to have a very small thickness. The battery pack employed in such devices may have a reduced thickness, while fixing battery cells and a protective circuit module within a frame, by providing a protective sheet attached to the protective circuit module for protecting the same, a preventive sheet for preventing short-circuits of electrode tabs, and a label attached to the resultant structure.

SUMMARY

In accordance with embodiments, there is provided a battery pack including one or more battery cells having a plurality of electrode tabs, a protective circuit module connected to the electrode tabs of the one or more battery cells, a frame accommodating the battery cells and the protective circuit module, and a protective tape covering the protective circuit module and the electrode tabs, a first surface of the protective tape including a plurality of grooves corresponding to the electrode tabs.

The battery pack may further include a label for fixing the battery cells and the protective circuit module to the frame. Here, a portion of the label is adhered to a second surface of the protective tape.

An adhered surface between the second surface of the protective tape protective tape and the label may be planar.

Depths of the grooves may be equal to heights of the electrode tabs protruding from the protective circuit module.

The protective tape may have a porous structure for emitting heat generated from the protective circuit module.

The protective tape may include a first protection layer positioned on the protective circuit module and having a plurality of grooves corresponding to the electrode tabs; and a second protection layer positioned on the first protection layer to cover the electrode tabs.

A thickness of the first protection layer may be equal to each of the heights of the electrode tabs protruding from the protective circuit module.

The first protection layer and the electrode tabs may be positioned on the same layer, and a top surface of the first protection layer and a top surface of the electrode tabs are coplanar.

The first protection layer and the second protection layer may include polycarbonate (PC) or different materials selected from polycarbonate (PC), polyethyleneterephthalate (PET) and polycarbonate/acrylonitrile-butadiene-styrene (PC/ABS).

The protective tape may include polycarbonate (PC).

The protective tape may be made of a transparent material.

An entire second surface of the protective tape may be flat, the second surface being opposite the first surface, and an entire portion of the first surface of the protective tape between adjacent grooves is flat.

The battery pack may further include a label directly on the protective tape, an entire contact surface between the label and the protective tape being flat and parallel to the protective circuit module.

An entire contact surface between the protective tape and the protective circuit module may be flat.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
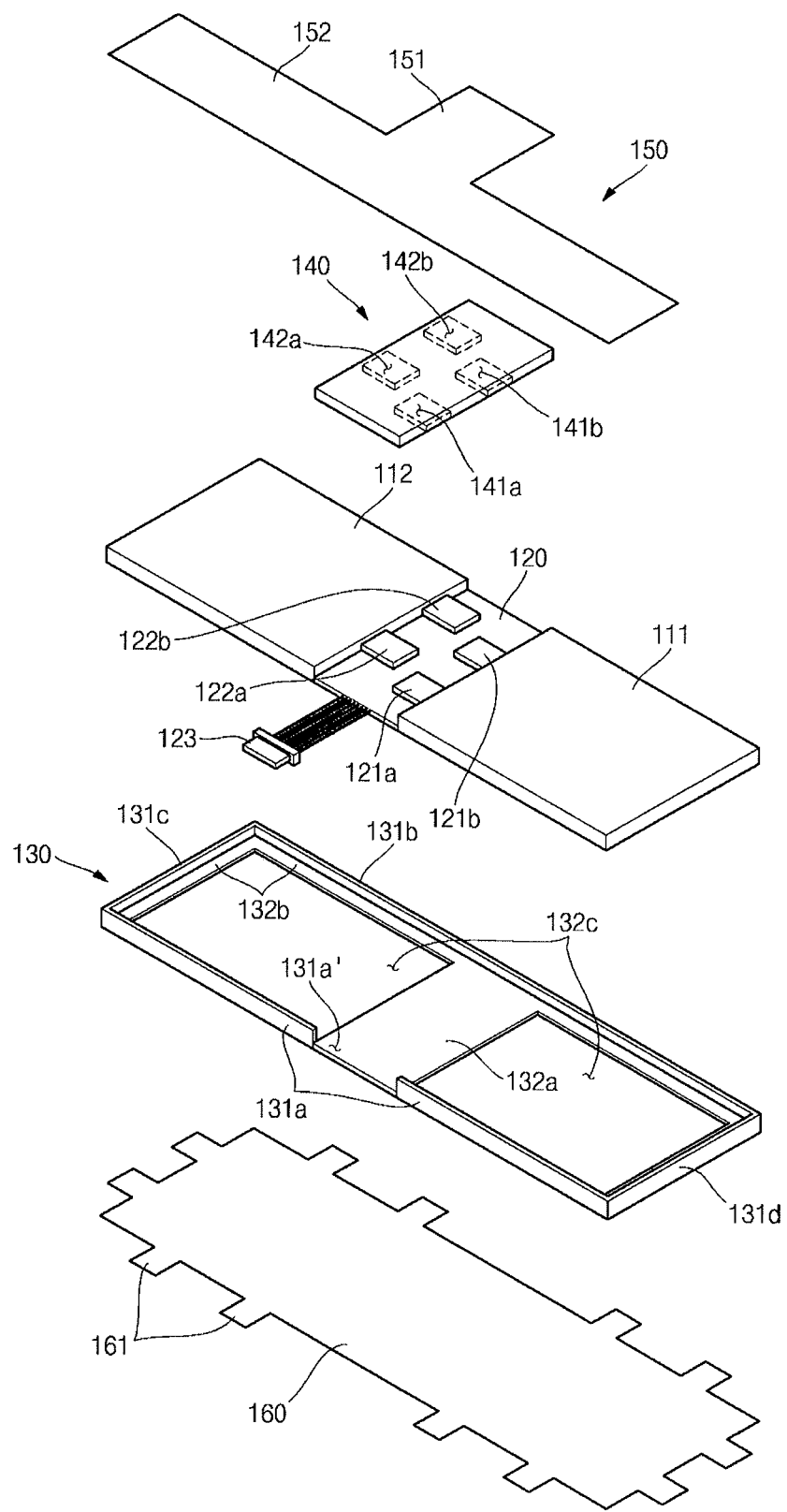
FIG. 1 illustrates an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
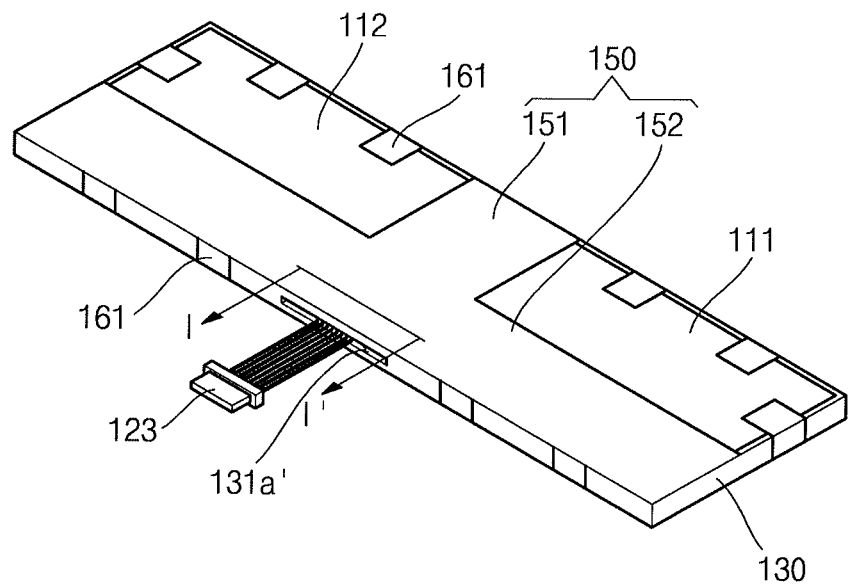
FIG. 2 illustrates a perspective view of the assembled battery pack in FIG. 1.

FIG. 1 is an exploded perspective view of a battery pack according to an embodiment, FIG. 2 is a perspective view of an assembled state of the battery pack shown in FIG. 1, FIG.

Figure 4A:
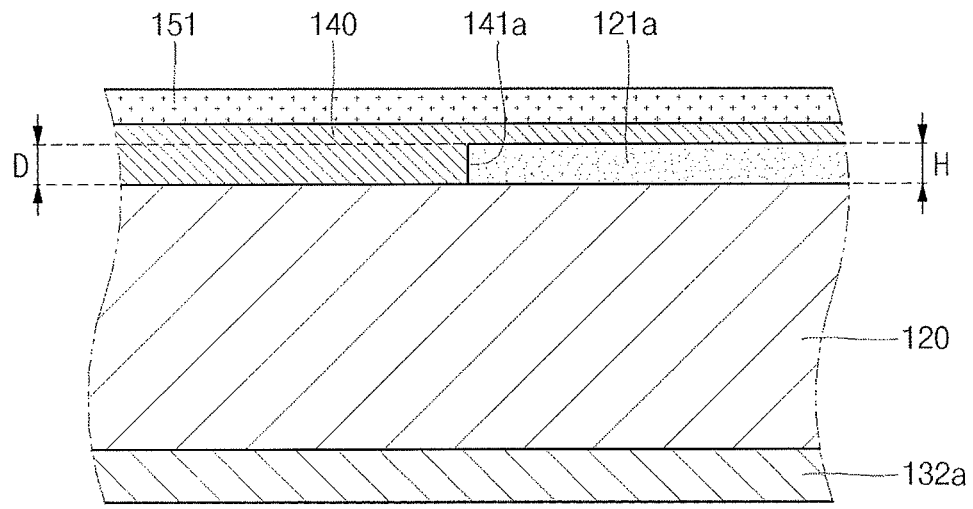
FIG. 4*a* illustrates a cross-sectional view along line I-I' in FIG. 2.

3 is a perspective view of an assembled state of the battery pack from which a first label is removed, and FIG. 4a is a cross-sectional view along line I-I' in FIG. 2.

Referring to FIGS. 1 to 4a, a battery pack 100 according to an embodiment may include a plurality of battery cells 111 and 112, a protective circuit module 120, a frame 130, and a protective tape 140. The battery pack 100 may further include first and second labels 150 and 160.

The battery cells 111 and 112 may include a first battery cell 111 and a second battery cell 112. The first battery cell 111 may include first and second electrode tabs 121a and 121b protruding to one side and having different polarities, and the second battery cell 112 may include first and second electrode tabs 122a and 122b protruding to one side and having different polarities. The first battery cell 111 and the second battery cell 112 may be disposed to face each other on a same plane, so that the first and second electrode tabs 121a and 121b of the first battery cell 111 and the first and second electrode tabs 122a and 122b of the second battery cell 112 may protrude in opposite directions, e.g., to face each other.

In an embodiment, the first and second battery cells 111 and 112 may be pouch-type batteries, but embodiments are not limited thereto. Further, while two battery cells 111 and 112 are illustrated in FIG. 2, embodiments are not limited to two battery cells, e.g., the battery pack according to embodiments may include a plurality of battery cells connected in series or parallel or in series and parallel.

The protective circuit module 120 is positioned between the first and second battery cells 111 and 112, and a first surface of the protective circuit module 120 is electrically connected to the first and second electrode tabs 121a, 122a, 121b, and 122b.

The protective circuit module 120 may include a plate-shaped circuit board, a plurality of wiring patterns formed on the circuit board, a plurality of conductive pads installed on the first surface of the circuit board and connected to the first and second electrode tabs 121a, 122a, 121b and 122b, and a plurality of protective elements installed on a second surface of the circuit board. Here, the first surface of the circuit board may be a top surface of the protective circuit module 120, and the second surface of the circuit board may be a bottom surface of the protective circuit module 120.

The protective circuit module 120 may include an external terminal 123 connected to one side of the protective circuit module 120 and drawn outside of the frame 130. The external terminal 123 may be electrically connected to the first and second electrode tabs 121a, 122a, 121b, and 122b through the wiring patterns and the conductive pads of the circuit board. Accordingly, the first and second battery cells 111 and 112 may be charged and discharged through the external terminal 123.

The frame 130 receives the first and second battery cells 111 and 112, and the protective circuit module 120. The frame 130 protects the first and second battery cells 111 and 112, and the protective circuit module 120 received therein from external surroundings. The frame 130 may include a first sidewall 131a, a second sidewall 131b, a third sidewall 131c, a fourth sidewall 131d, a first support part 132a, and a second support part 132b.

The first and second sidewalls 131a and 131b are installed to face each other so as to surround, e.g., extend along, opposite sides of the first and second battery cells 111 and 112 and one side of the protective circuit module 120. An exposing hole 131a' may be formed in the first sidewall 131a, so the external terminal 123 of the protective circuit module 120 may be drawn through the exposing hole 131a' outside the frame 130. The exposing hole 131a' may be a portion facing the one side of the protective circuit module 120, e.g., a portion of the first sidewall 131a facing and immediately adjacent to the protective circuit module 120 may be removed to define the exposing hole 131a'.

The third and fourth sidewalls 131c and 131d are installed to face each other so as to surround, e.g., extend along, the other opposite sides of the first and second battery cells 111 and 112. Opposite ends of the third sidewall 131c may be connected to ends of the first and second sidewalls 131a and 131b, respectively, and opposite ends of the fourth sidewall 131d may be connected to the other ends of the first and second sidewalls 131a and 131b, respectively. Accordingly, the first to fourth sidewalls 131a to 131d may be shaped into a substantially rectangular frame.

The first support part 132a may be roughly shaped as a plate traversing the rectangular shape defined by the first to fourth sidewalls 131a to 131d. The first support part 132 may connect a portion around the exposing hole 131a' of the first sidewall 131a to the second sidewall 131b, e.g., the first support part 132 may extend from the exposing hole 131a' of the first sidewall 131a to the second sidewall 131b, to define a, e.g., flat, space for the protective circuit module 120 in the frame 130. As such, the protective circuit module 120 may be placed on and supported by the first support part 132a in the frame 130. In addition, the first support part 132a may protect the protective circuit module 120 by covering, e.g., completely overlapping, a bottom surface of the protective circuit module 120.

Figure 3:
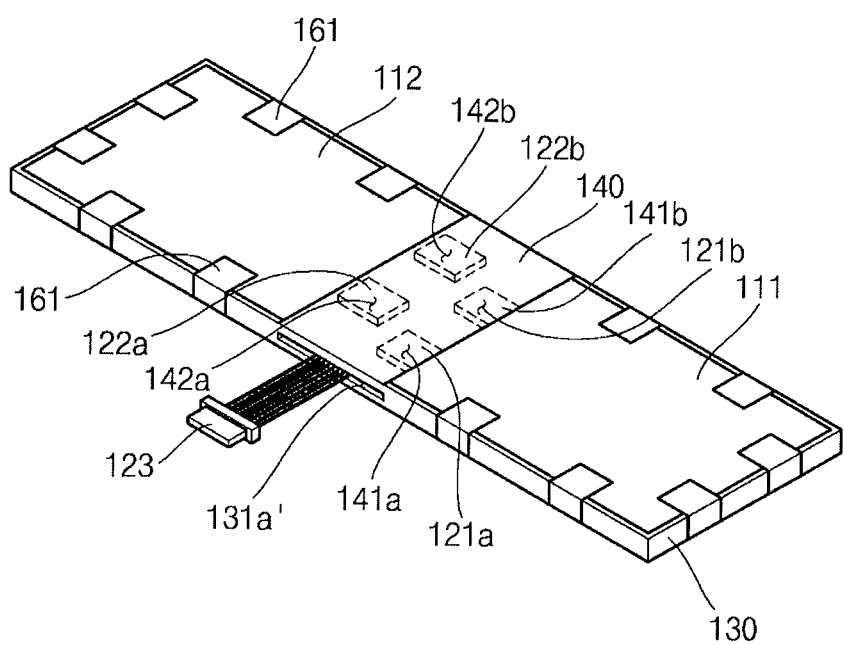
FIG. 3 illustrates a perspective view of an assembled battery pack from which a first label is removed.

The second support part 132b may inwardly protrude along bottom ends of the first to fourth sidewalls 131a to 131d. The second support part 132b may mount and support the battery cells 111 and 112 within the frame 130 so as to prevent the first and second battery cells 111 and 112 from deviating to an opening part 132c of the frame 130. For example, the first and second support parts 132a and 132b may be level and integral with each other to define two connected frame structures surrounding two opening parts 132c separated by the first support part 132a, so the first and second battery cells 111 and 112 may be placed on and supported by the first and second support parts 132b while being surrounded by the first through fourth sidewalls (FIG. 3).

The protective tape 140 covers the top surface of the protective circuit module 120 and the electrode tabs 121a, 122a, 121b, and 122b connected to the protective circuit module 120. Therefore, the protective tape 140 protects the top surface of the protective circuit module 120 and prevents the electrode tabs 121a, 122a, 121b, and 122b from being short-circuited.

The protective tape 140 may include a single layer or two layers. The protective tape 140 including a single layer will first be described.

In a case where the protective tape 140 includes a single layer, first to fourth grooves 141a, 141b, 142a, and 142b respectively corresponding to the electrode tabs 121a, 122a, 121b, and 122b may be formed on a first surface of the protective tape 140. For example, as shown in FIG. 1, the first and second electrode tabs 121a and 121b of the first battery cell 111 may correspond to the first and second grooves 141a and 141b of the protective tape 140, and the first and second electrode tabs 122a and 122b of the second battery cell 112 may correspond to the third and fourth grooves 142a and 142b of the protective tape 140. Here, the first surface of the protective tape 140 may correspond to a bottom surface of the protective tape 140, and a second surface of the protective tape 140 may correspond to a top surface of the protective tape 140.

The first to fourth grooves 141a, 141b, 142a, and 142b may have depths equal to heights of the electrode tabs 121a, 122a, 121b and 122b protruding from the top surface of the protective circuit module 120. For example, as shown in FIG. 4a, a depth D of the first groove 141a may be equal to a height H of the first electrode tab 121a of the first battery cell 111 protruding from the top surface of the protective circuit module 120. For example, shapes of the first to fourth grooves 141a, 141b, 142a, and 142b may be the same as shapes of corresponding electrode tabs 121a, 122a, 121b and 122b, so each of the electrode tabs 121a, 122a, 121b and 122b may fit tightly within a corresponding first to fourth groove 141a, 141b, 142a, and 142b. For example, as illustrated in FIGS. 3-4a, the entire top surface of the protective tape 140 may be flat, and entire portions of the bottom surface of the protective tape 140 between adjacent grooves may be flat.

In contrast, when grooves corresponding to electrode tabs are not formed in a conventional protective tape, a portion of the top surface of the protective tape may protrude as much as the height of the electrode tabs when the protective tape is attached, i.e., the portion of the top surface of the protective tape may be pushed upward by the electrode tabs. As a result, a region on the protective tape along the periphery of the electrode tabs may exhibit reduced adhesion, e.g., may be non-adhesive. As such, the conventional protective tape and the protective circuit module may not be firmly adhered to each other, thereby lowering adhesion of the conventional protective tape.

However, according to embodiments, the grooves 141a, 141b, 142a, and 142b corresponding to the electrode tabs 121a, 122a, 121b, and 122b are formed in the protective tape 140, thereby defining a flat bottom surface of the protective tape 140 that has a complementary shape with respect to the electrode tabs 121a, 122a, 121b, and 122b. Accordingly, the flat shape of the bottom surface of the protective tape 140 has a good surface contact with the top surface of the protective circuit module 120, including regions along the periphery of the electrode tabs, thereby exhibiting improved adhesion of the protective tape 140.

In addition, the protective tape 140 may include polycarbonate (PC) and may be made of a transparent material. Conventionally, protective sheets for protecting the protective circuit module and the electrode tabs are separately attached. In this regard, since the conventional protective sheets are made of opaque materials, it may be difficult to determine accurate positions to be adhered.

Figure 4B:
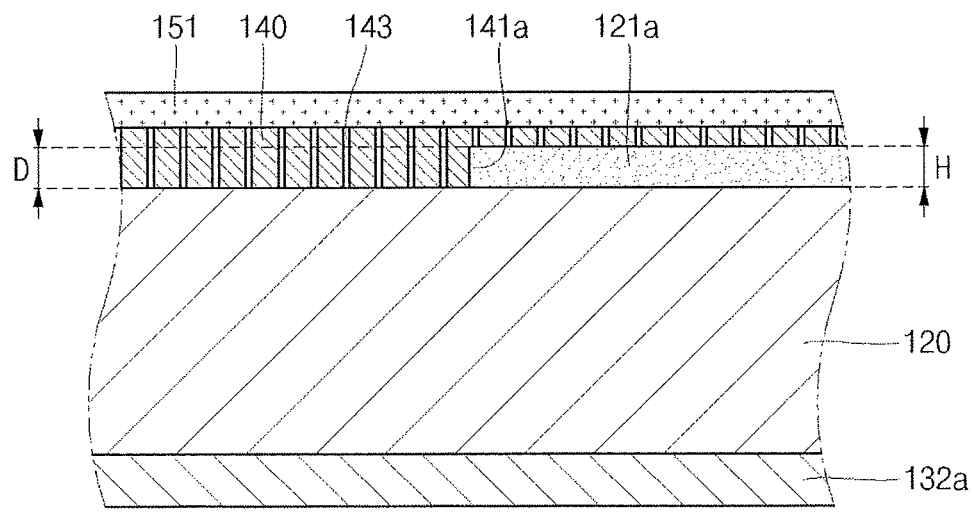
FIG. 4*b* illustrates a cross-sectional view according to another embodiment along line I-I' in FIG. 2.

According to embodiments, however, since the protective tape 140 is integrally formed and is made of a transparent material, it is possible to more easily identify a position of the protective tape 140 to be adhered. Therefore, attachment of the protective tape 140 may be facilitated. In addition, the protective tape 140 may have a porous structure with pores 143 for more efficiently emitting heat generated from the protective circuit module 120 (FIG. 4b).

Next, a protective tape 140' including two layers will now be described.

Figure 5:
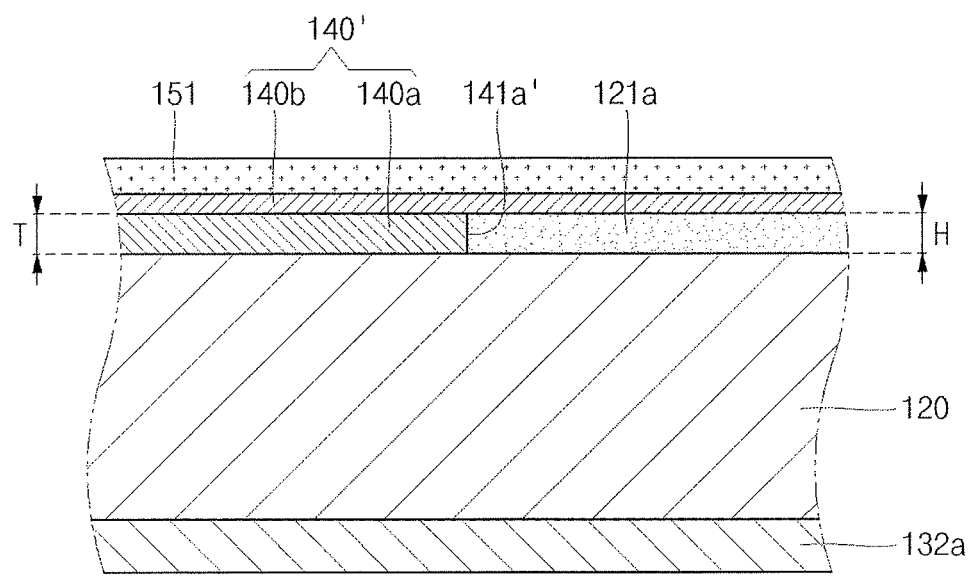
FIG. 5 illustrates a cross-sectional view of a battery pack according to another embodiment along line I-I' in FIG. 2.
Figure 6:
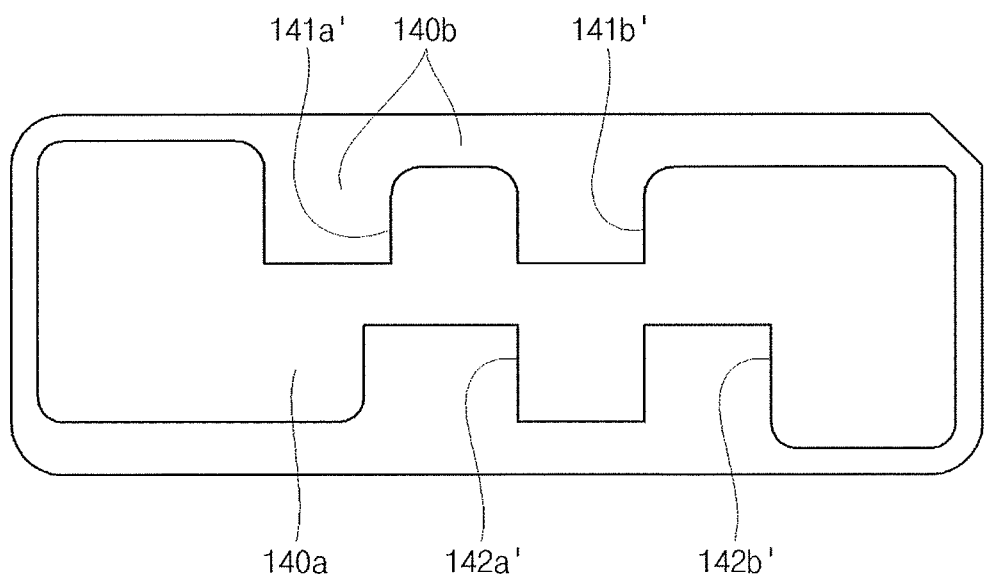
FIG. 6 illustrates a bottom surface of a protective tape of the battery pack in FIG. 5.

FIG. 5 is a cross-sectional view along line I-I' in FIG. 2 of a battery pack according to another embodiment, and FIG. 6 illustrates a bottom surface of the protective tape 140' in FIG. 5.

As shown in FIGS. 5 and 6, the protective tape 140' may include a first protection layer 140a and a second protection layer 140b.

The first protection layer 140a is adhered to the top surface of the protective circuit module 120 and protects a top portion of the protective circuit module 120. A plurality of holes 141a', 141b', 142a', and 142b' respectively corresponding to the electrode tabs 121a, 122a, 121b, and 122b may be formed in the first protection layer 140a. For example, the first and second electrode tabs 121a and 121b of the first battery cell 111 may correspond to first and second holes 141a' and 141b' of the first protection layer 140a, respectively, and the first and second electrode tabs 122a and 122b of the second battery cell 112 may correspond to third and fourth holes 142a' and 142b' of the first protection layer 140a, respectively. As shown in FIG. 6, side portions of the holes 141a', 141b', 142a', and 142b' may be opened to avoid interference between each of the electrode tabs 121a, 122a, 121b, and 122b and each of the first and second battery cells 111 and 112, respectively.

The first protection layer 140a may have a thickness equal to the height of each of the electrode tabs 121a, 122a, 121b, and 122b protruding from the top surface of the protective circuit module 120. For example, as shown in FIG. 5, a thickness T of the first protection layer 140a may be equal to the height H of the first electrode tab 121a of the first battery cell 111 protruding from the top surface of the protective circuit module 120. This means that the depths of the holes 141a', 141b', 142a', and 142b' formed in the first protection layer 140a are equal to the height H of each of the electrode tabs 121a, 122a, 121b and 122b protruding from the top surface of the protective circuit module 120. Accordingly, the first protection layer 140a and the electrode tabs 121a, 122a, 121b, and 122b may be positioned on the same layer, and top surfaces of the first protection layer 140a and the electrode tabs 121a, 122a, 121b, and 122b may be level with each other, i.e., form one and the same plane.

The second protection layer 140b is positioned on the top surface of the first protection layer 140a so as to cover top portions of the electrode tabs 121a, 122a, 121b, and 122b exposed through the holes 141a', 141b', 142a', and 142b', thereby preventing the electrode tabs 121a, 122a, 121b and 122b from being short-circuited. As described above, since the top surfaces of the first protection layer 140a and the electrode tabs 121a, 122a, 121b, and 122b form one plane, the top surface of the second protection layer 140b may be planar.

In a case where holes corresponding to the electrode tabs are not formed in the first protection layer, unlike in the conventional art, a portion of the top surface of the first protection layer may protrude as much as the height of the electrode tab. A non-adhesive region is formed on the first protection layer along the periphery of the electrode tab. As a result, the first protection layer and the protective circuit module 120 may not be firmly adhered to each other, thereby lowering adhesion of the first protection layer.

However, in the current embodiment, the holes 141a', 141b', 142a', and 142b' corresponding to the electrode tabs 121a, 122a, 121b, and 122b are formed in the first protection layer 140a. Therefore, the bottom surface of the protective tape 140' is perfectly adhered to the electrode tabs 121a, 122a, 121b, and 122b as well as to the top surface of the protective circuit module 120, thereby improving adhesion of the protective tape 140.

Both of the first and second protection layers 140a and 140b may include polycarbonate (PC) and may be made of different materials, e.g., polycarbonate (PC), polyethyleneterephthalate (PET), and polycarbonate/acrylonitrile-butadiene-styrene (PC/ABS). In addition, the first and second protection layers 140a and 140b may be made of transparent materials.

Conventionally, the protective sheets for protecting the protective circuit module and the electrode tabs are separately attached. In this regard, since the conventional protective sheets are made of opaque materials, it may be difficult to accurately position the protective sheets to be adhered to protective circuit module.

In contrast, in the current embodiment, as shown in FIG. 3, since the protective tape 140 is made of a transparent material, it is possible to more easily identify a position of the protective tape 140 to be adhered, thereby facilitating attachment of the protective tape 140. In addition, the protective tape 140 may have a porous structure for more efficiently emitting heat generated from the protective circuit module 120.

Referring back to FIGS. 1-2, the first label 150 may be adhered to a top edge of the frame 130, top surfaces of the battery cells 111 and 112, and the top surface of the protective tape 140, thereby fixing the battery cells 111 and 112 and the protective circuit module 120 to the frame 130. Here, since the top surface of the protective tape 140 is planar, the top surface of the first label 150 is also planar.

Conventionally, the adhered surface between the protective tape and the label is a non-uniform surface, resulting in poor adhesion between the protective tape and the label. In the current embodiment, however, the adhered surface between the protective tape and the label is a uniformly flat surface. Accordingly, the adhesion between the protective tape and the label may be improved.

Referring back to FIGS. 1 and 3, the second label 160 may be adhered to a bottom edge of the frame 130 and bottom surfaces of the battery cells 111 and 112, thereby fixing the battery cells 111 and 112 to the frame 130. In addition, the second label 160 may include a plurality of fixing parts 161. The fixing parts 161 extend up to the top edge of the frame 130 to surround the external portion of the frame 130, thereby more efficiently adhering and fixing the second label 160 to the frame 130.

By way of summary and review, in order to attach a conventional protective sheet and a conventional preventive sheet to the protective circuit module and the electrode tabs, it may be necessary to identify locations of the protective circuit module and the electrode tab, thereby lowering an attaching work speed. Further, it may be difficult to identify accurate positions of the protective circuit module and the electrode tab due to opaqueness of the conventional protective and preventive sheets. In addition, when the conventional protective sheet is attached, a portion of a top surface of the protective tape may protrude as much as a height of the electrode tab protruding from the top surface of the protective circuit module, thereby causing formation of a non-adhesive region on the protective sheet along the periphery of the electrode tab. As a result, the conventional protective tape and the protective circuit module may not be firmly adhered to each other, thereby lowering adhesion of the protective sheet.

In contrast, according to embodiments, a battery pack exhibits improved adhesion between a protective tape and each of a protective circuit module and a label. That is, embodiments provide a battery pack with a protective tape having a flat surface contacting the protective circuit module and a uniformly flat surface contacting the label, thereby facilitating improved adhesion therebetween.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   battery cells, each battery cell including electrode tabs, opposing battery cells having electrode tabs facing each other;
   a protective circuit module between opposing battery cells and connected to the electrode tabs of the battery cells, a first surface of the protective circuit module including wirings patterns connected to the electrode tabs;
   a frame accommodating the battery cells and the protective circuit module; and
   a protective tape including a first surface adhered to the first surface of the protective circuit module and the electrode tabs, the first surface of the protective tape including a plurality of grooves corresponding to the electrode tabs, wherein the electrode tabs are inserted in the grooves of the protective tape.

2. The battery pack as claimed in claim 1, further comprising a label configured to fix the battery cells and the protective circuit module to the frame, a portion of the label being connected to a second surface of the protective tape.

3. The battery pack as claimed in claim 2, wherein an interface between the second surface of the protective tape and the portion of the label connected to the protective tape is planar.

4. The battery pack as claimed in claim 1, wherein depths of the grooves are equal to heights of the electrode tabs protruding from the protective circuit module.

5. The battery pack as claimed in claim 1, wherein the protective tape further includes a porous structure for emitting heat generated from the protective circuit module.

6. The battery pack as claimed in claim 1, wherein the protective tape includes:
   a first protection layer positioned on the protective circuit module and having the plurality of grooves corresponding to the electrode tabs; and
   a second protection layer positioned on the first protection layer to cover the electrode tabs.

7. The battery pack as claimed in claim 6, wherein a thickness of the first protection layer equals a height of the electrode tabs protruding from the protective circuit module.

8. The battery pack as claimed in claim 7, wherein each of the first protection layer and the electrode tabs is positioned directly on a same layer, and a top surface of the first protection layer and a top surface of the electrode tabs are coplanar.

9. The battery pack as claimed in claim 6, wherein each of the first protection layer and the second protection layer includes polycarbonate (PC), polyethyleneterephthalate (PET), and/or a polycarbonate/acrylonitrile-butadiene-styrene (PC/ABS).

10. The battery pack as claimed in claim 1, wherein the protective tape includes polycarbonate (PC).

11. The battery pack as claimed in claim 1, wherein the protective tape is transparent.

12. The battery pack as claimed in claim 1, wherein an entire second surface of the protective tape is flat, the second surface being opposite the first surface, and an entire portion of the first surface of the protective tape between adjacent grooves is flat.

13. The battery pack as claimed in claim 1, further comprising a label directly on the protective tape, an entire contact surface between the label and the protective tape being flat and parallel to the protective circuit module.

14. The battery pack as claimed in claim 13, wherein an entire contact surface between the protective tape and the protective circuit module is flat.

15. The battery pack as claimed in claim 1, wherein the protective tape is in direct contact with the electrode tabs.

16. The battery pack as claimed in claim 15, wherein the protective tape is in direct contact with a portion of the protective circuit module.

17. The battery pack as claimed in claim 16, wherein the protective tape extends entirely between the electrode tabs.

18. The battery pack as claimed in claim 15, wherein the protective tape includes a same material that extends along sidewalls of the electrode tabs and on top of the electrode tabs.

19. The battery pack as claimed in claim 1, wherein a depth of each groove is less than a total thickness of the protective tape.

* * * * *